United States Patent [19]

Sodermalm

[11] Patent Number: 5,517,863
[45] Date of Patent: May 21, 1996

[54] DEVICE FOR INDICATION OF PREDETERMINED TENSION OF ELONGATE FLEXIBLE ELEMENTS

[75] Inventor: Svante Sodermalm, Gothenburg, Sweden

[73] Assignee: AB Volvo, Gothenburg, Sweden

[21] Appl. No.: 457,801

[22] Filed: Jun. 1, 1995

Related U.S. Application Data

[63] Continuation of Ser. No. 167,990, Mar. 7, 1994, abandoned.

[30] Foreign Application Priority Data

Jul. 22, 1991 [SE] Sweden .................................. 9102218

[51] Int. Cl.⁶ ..................................................... G01L 5/04
[52] U.S. Cl. ..................................... 73/862.42; 73/862.391
[58] Field of Search ........................ 73/862.194, 862.391, 73/862.42, 862.451, 862.453, 862.46, 862.472, 831

[56] References Cited

U.S. PATENT DOCUMENTS

| | | | |
|---|---|---|---|
| 2,182,267 | 7/1937 | Scusa | 73/862.433 |
| 2,723,561 | 11/1952 | Chaya et al. | 73/862.472 |
| 3,570,307 | 3/1971 | Cohen et al. | |
| 3,832,899 | 9/1974 | Nicolau | |
| 4,437,352 | 3/1984 | Deborde et al. | |
| 4,444,065 | 4/1984 | Okamuro | 73/862.453 |
| 4,860,597 | 8/1989 | Fenech | |

Primary Examiner—Richard Chilcot
Assistant Examiner—Max Noori
Attorney, Agent, or Firm—Burns, Doane, Swecker & Mathis

[57] ABSTRACT

A device (1) for indicating a predetermined tension of a driving belt (31) comprises a base (8), a hub (9) on the base for the drive belt, two links (10) pivotally connected to the base and having outer abutments (11) for the drive belt, and a helical tension spring (12) which is attached to the links (10) and which exert a reactional force corresponding to the predetermined tensional force. The links (10) are arranged for synchronized pivotal movement between two stable end positions for snap-over movement past the center axis of the hub (9). When the links assume one (C) of their end positions, the drive belt (31) may be moved into abutment against the abutments (11) and the hub (9) and may be tightened while the links (10) are pivoted in synchrony against the action of the helical tension spring (12) until the drive belt extends along a straight line between the abutments. The predetermined tensional force and the reactional force now correspond to one another and thus effect the snap-over movement of the links to the opposite end position of the latter. The very snap-over is the indication of obtainment of the predetermined tension of the drive belt (31).

8 Claims, 4 Drawing Sheets

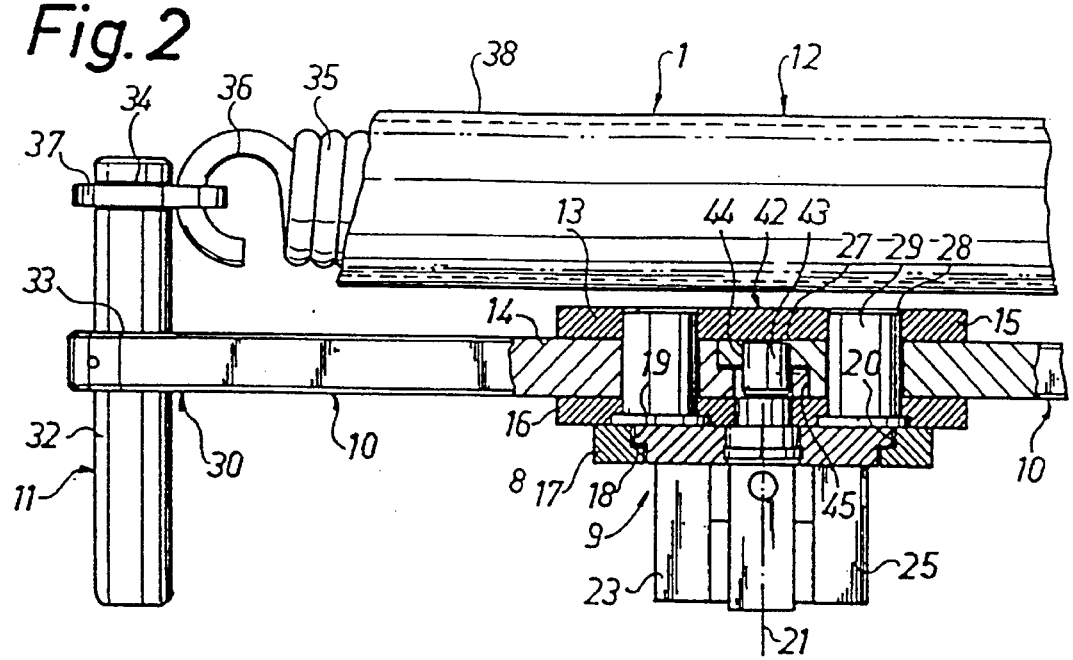
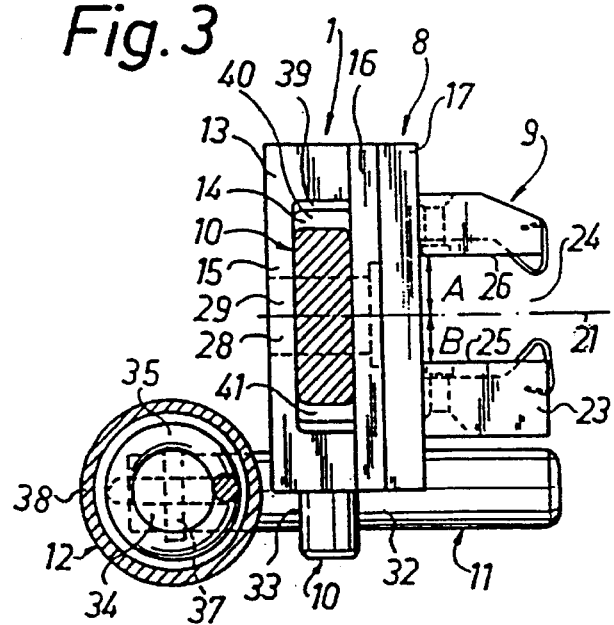

5,517,863

1

DEVICE FOR INDICATION OF PREDETERMINED TENSION OF ELONGATE FLEXIBLE ELEMENTS

This application is a continuation of application Ser. No. 08/167,990, filed Mar. 7, 1994, now abandoned.

BACKGROUND OF THE INVENTION

The subject invention concerns a device for indication of a predetermined tension of elongate flexible elements, primarily of belts incorporated in belt transmissions, e.g. driving belts used in combustions engines and running around belt pulleys to drive the generator, the radiator fan, the servo pump, air conditioning unit, etcetera.

During the assembly of new as well as reconditioned combustion engines, it is customary to simultaneously install the driving belt or belts driving the equipment items mentioned above. In a manner similar to that used when worn-out belts are replaced by new ones, these belts are placed loosely around the various pulleys with the adjustment device of e.g. the generator in a non-tightened condition. The set screws of the adjustment device is then tightened by means of a suitable tool, such as a screwdriver, while at the same time the belt is tightened by means of another suitable tool, e.g. a lever acting on the generator so as to force the latter outwards. The magnitude of the belt tension is usually checked by the operator who, for instance with the aid of his thumb, depresses the belt at a point intermediate two adjacent pulleys, and the tightening force or belt tension is normally considered to be "correct" if the force exerted on the belt in this manner amounts to a depression corresponding approximately to 10 mm.

However, this method does not make it possible to ascertain with sufficient certainty the actual value of the belt tension, in addition to which the tension may vary within very wide limits from one engine to the next. Some belts therefore wear out prematurely as a result of slippage.

Since in modern engines, particularly motor vehicle engines, the driving belts are dimensioned for a comparatively long serviceable life, which is a feature requested by the consumer, it is necessary to make arrangements ensuring that a value of the tensional force may be achieved in a reproduceable manner and at a carefully predetermined level with only very minute tolerance deviations.

SUMMARY

A purpose of the subject invention is to provide a device meeting the demands outlined above in a simple, rapid and reliable manner.

This purpose is achieved in that the device comprises a base, a hub associated with the base and protruding therefrom and including a means for supporting the elongate element, two links pivotally connected to the base at their first, inner end and projecting in opposite directions from the base essentially at right angles to the hub, each link formed at its opposite, outer end with an abutment, said abutments being equidistantly spaced from the hub to support the elongate element, and a resiliently yielding member connected to the links and possessing a reactional force corresponding to the predetermined tension of the elongate element, said links being arranged for synchronized pivotal movement between two stable and positions while passing an imaginary line interconnecting the abutment means past the hub for snap-over movement, the elongate element arranged, when the links assume one of their end positions, to be moved to a position of abutment against the link abutments and the hub support surface and to be tightened upon the synchronized pivotal movement of the links against the action of the resiliently yieldable member, until said elongate element extends along an essentially straight line interconnecting the abutments, at which moment the predetermined tension of the elongate element and the reactional force of the resiliently yieldable means become equal and, in response to the resiliently yieldable member, said links snap over to their opposite end position, said snap-over movement per se being an indication of obtainment of the predetermined tension of said elongate element.

BRIEF DESCRIPTION OF THE DRAWINGS

The invention will be described in closer detail in the following with reference to the accompanying drawings, illustrating a particular, at the moment preferred embodiment of the device in accordance with the invention. In the drawing figures:

FIG. 2 illustrates the same device in a view from above, and partly broken and partly cut along line II—II of FIG. 1, FIG. 3 illustrates the devices as seen from the left end in accordance with FIG. 1 and partly in a transverse sectional view.

DETAILED DESCRIPTION OF THE PREFERRED EMBODIMENTS

As outlined in the aforegoing, the device indicated generally by numeral 1, which device could also be called an indicator or a gauge, is intended to indicate the existence of a predetermined tension of the elongate flexible element 2.

Figure 4:
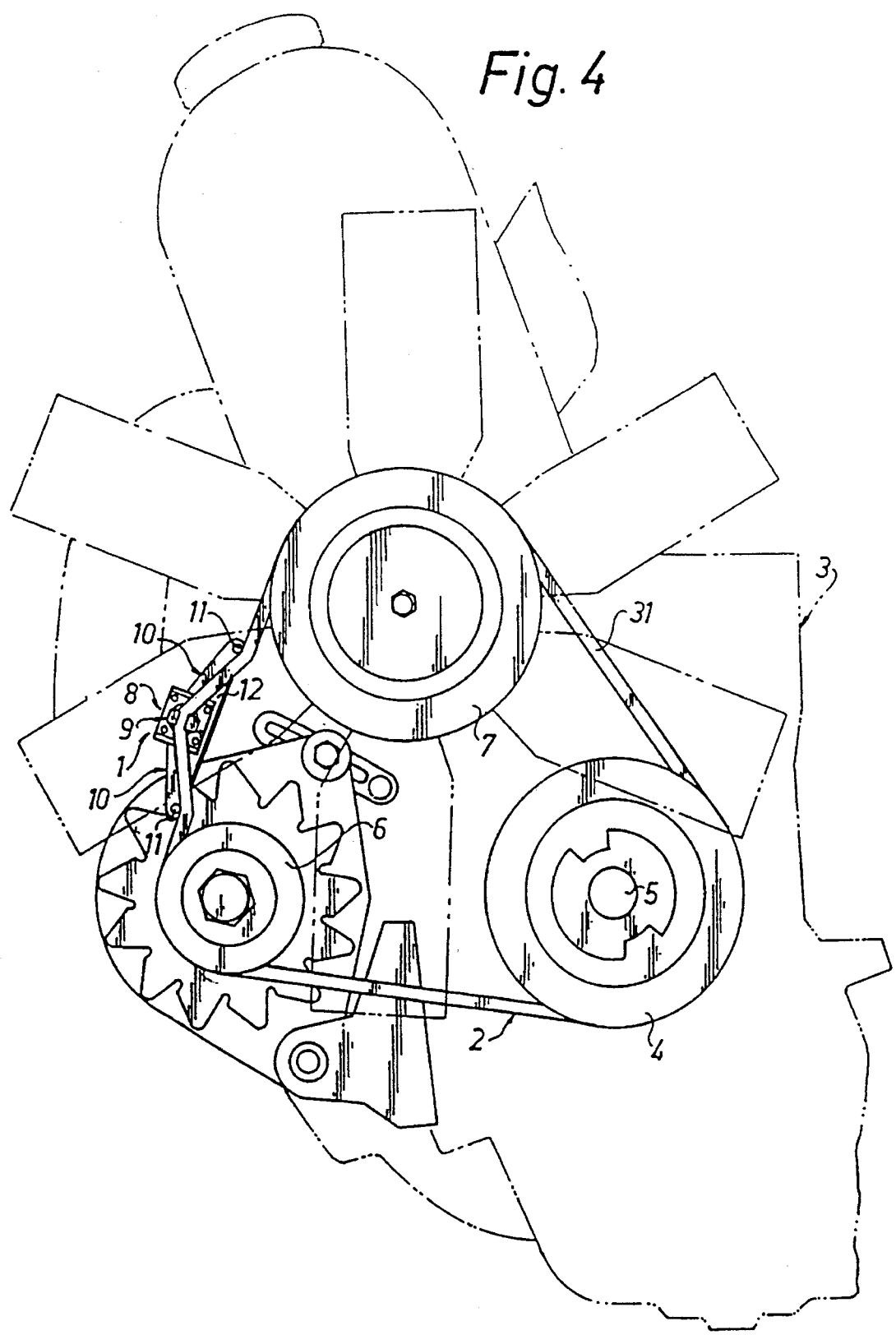
FIG. 4 shows one example of using the device to tighten driving belts of motor vehicle engines.

As appears from FIG. 4, the flexible element 2 in accordance with the embodiment described is in the form of a conventional driving belt 31 of a combustion engine 3. The driving belt is wrapped around a driving pulley 4 mounted on the free end of a crankshaft 5, a generator pulley 6, and a radiator fan pulley 7. More than one driving belt 31 may be provided, for instance driving belts arranged in pairs, or driving belts arranged to drive additional equipment, such as the servo pump for servo control and air-condition compressors.

The main components of the indicator 1 are a base 8, a hub 9, two links 10, each with an abutment 11, and a resiliently yieldable means 12.

Figure 1:
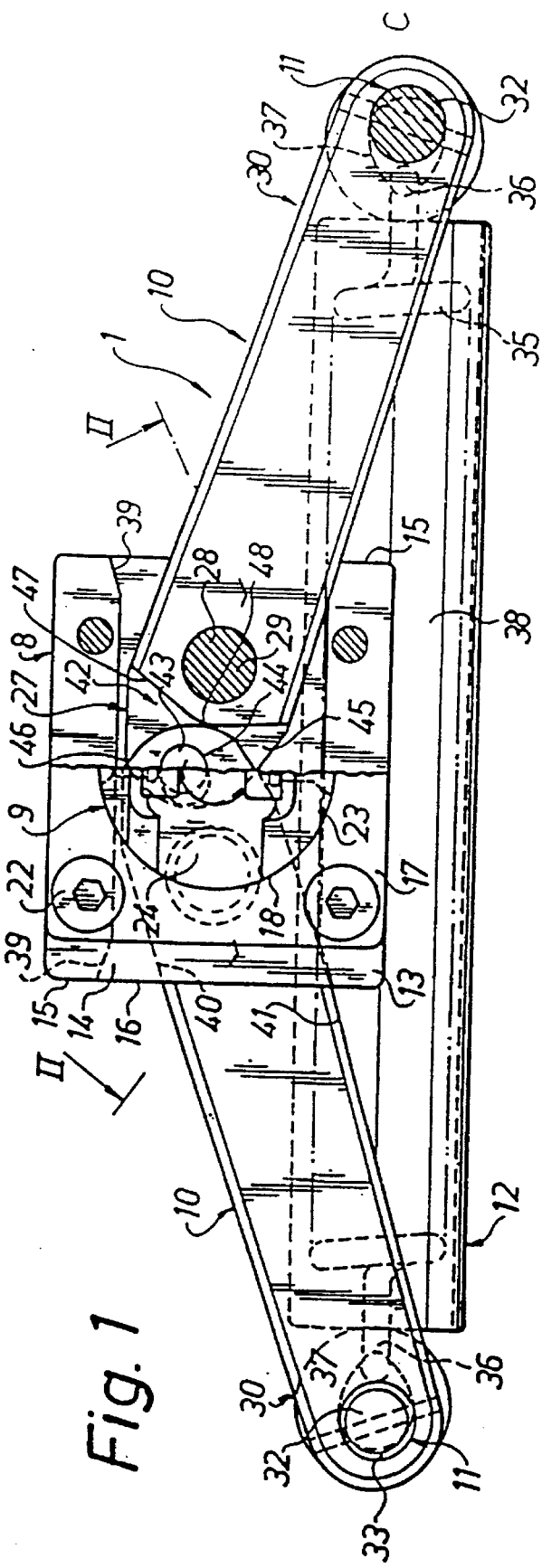
FIG. 1 illustrates the device in a front view which is partly cut in order to show the components behind.

The base 8 comprises a rectangular metal support plate 13 with a recess 14 formed therein e.g. through milling and which recess, as seen from the front according to FIG. 1, extends horizontally between the opposite edge faces 15 of the support plate 13. The recess 14 is open at the ends and is also open outwards, i.e. towards the front as seen in FIG. 1.

In addition, the base 8 comprises a likewise rectangular covering plate 16 having the same outline configuration as the support plate 13 and also made from metal. The covering plate covers the support plate, and consequently the recess 14 formed therein, in the outwards direction in such as manner that a through-channel is defined between the plates 13 and 16.

As seen from the front, the hub 9 has an essentially circular configuration and preferably it is made from metal or some suitable plastics material. The hub 9 projects from the base 8, in FIG. 1 towards the viewer, and it is secured to the base by means of an attachment plate 17 of metal having an outline configuration essentially agreeing with that of the support and covering plates 13, 16. The attachment plate 17 comprises a central circular aperture 18 with a shoulder 19 therein, in which aperture the hub 9 is rotationally mounted by means of a circularly cylindrical flange 20 abutting against the shoulder 19. In this manner, the hub may be turned about its centre axis 21 for a purpose to be described in closer detail in the following.

As appears above all from FIGS. 2 and 3, the support plate 13, the covering plate 16, and the attachment plate 17 are joined together by means of fasteners 22, for instance screws, rivets, and the like, with the plate side faces in abutting relationship in such a manner as to form a housing.

To revert to the hub 9, the latter has a support 23 for the belt 31 and in accordance with the embodiment illustrated the support is formed by a transverse slit 24 which is open outwards and at its ends for reception of the belt 31. The slit 24 is essentially parallel with the recess 14 described in the aforegoing and comprises two parallel spaced-apart support faces 25, 26. As appears from FIG. 3, these support faces are spaced different distances A and B from the centre axis 21 of the hub and are intended for different belts which, although of different thicknesses, are to be given the same degree of taughtness.

The two links 10 are configured as elongate, rather flat arms and they, too, are preferably made from metal. At one first, inner end 27, the links 10 are pivotally mounted to the base 8, more precisely in the recess 14 of the support plate 13, and they extend in opposite directions therefrom, essentially at right angles to the hub 9. In the area of their inner ends 27 the links 10 and the support and covering plates 13, 16 are formed with aligned holes 28 for reception therein of pivot pins 29 or similar means for the pivotal connection of the links 10 to the base 8.

At the opposite, outer link ends 30 each link 10 supports an abutment 11 for engagement with the belt 31. In accordance with the embodiment illustrated, these abutments are in the shape of pins 32, each one of which projects in both directions from its associated link 10 in parallel with the hub 9. The pins 32 are spaced equal distances from the latter. One half of each pin 32 forms the abutment means 11 proper and projects in the same direction as the hub 9, thus allowing the belt 31 to run around these pin halves.

The pins 32 thus project through attachment holes 33 formed in the associated links 10, and the other half of each pin protrudes from the face of the links 10 opposite the abutments 11 so as to form a member 34 on which may be attached the resiliently yieldable means 12.

In accordance with the embodiment illustrated, the resiliently yieldable means 12 is a helical tension spring 35 the ends 36 of which are secured to the attachment member 34 of the pine 32, in this case by means of flat connective washers 37. As protection against possible clamping damages a protective sleeve 38 of plastics or a similar material is threaded onto the helical tension spring 35.

The helical tension spring 35 is dimensioned and calibrated so as to ensure that it exerts a reactional force corresponding to the predetermined tension of the belt 31. This reactional force or counter-force and tension, respectively, may typically mount to 425+25N for a particular application.

The links 10 described previously are arranged to be shifted in synchrony between two stable end positions, C in FIGS. 1 and in 7D while passing an imaginary line E interconnecting the abutments 11, past the hub 9, i.e. the centre axis 21 thereof, and thus to snap over from one to the other end position.

In order to limit the angle of pivotment of the links 10 to say 60°–80° and thus also to define the two stable end positions C, D of the links 10, the recess 14 in the support plate 13 described previously is formed with oblique abutment faces 39 adjacent its open ends near the plate edges 15. The inclination of each one of these oblique abutment faces 39 corresponds to essentially half the angle of pivotement, and under the action of the helical traction spring 35 the upper and lower edge faces 40, 41 on the links 10 may be moved to a position wherein they abut against the oblique abutments 39.

Adjacent the inner ends of the links 10, at a point interiorly of the pivot pins 29, i.e. at a point intermediate the latter and the free link ends, see FIGS. 1 and 2, a synchronizing mechanism 42 interconnects the links 10 to ensure their synchronized pivotal movement. In accordance with the embodiment illustrated, this synchronizing mechanism comprises a metal pin 43 extending through aligned holes 44 formed in the links and having a height essentially agreeing with the thickness of each link, whereby it will be enclosed by the links and not interfere with the pivotal movement of the links about the pivot pins 29 in the recess 14.

In the area of the synchronizing mechanism 42 the links 10 are formed with facing recesses 45, whereby the innermost portions of the inner ends 27 of the links 10 will overlap and have face-to-face contact, the synchronizing mechanism 42 being arranged in the area of these end portions.

The links 10 are formed with inner, evenly curved end edge faces 46, each in rolling abutment against its associated counter edge faces 47 formed by the point where the associated recess 45 merges into the links 10 and having straight side portions and a centrally positioned cam nose 48. The edge faces 46 and the counter edge faces 47 thus form cooperating cam faces which, upon synchronized pivotal movement of the links against the action of the helical tension spring 35 determine the point where the snap-over action is to take place.

The hole 44 in one of the links 10 is essentially circular whereas the hole 44 in the opposite link is essentially oblong with its major axis extending in the lengthwise direction of the associated link. In this manner the pin 43 is allowed some lateral movement, in the embodiment illustrated over a distance corresponding to approximately ¼ of the diameter of the pin 43, in compensation for the mutual lateral movement of the holes 44 over the same distance that will occur when the links 10 pivot about the pivot pins 29 from one to the other of the two stable end positions C, D defined by the abutments 39 in the recess 14.

Figure 5:
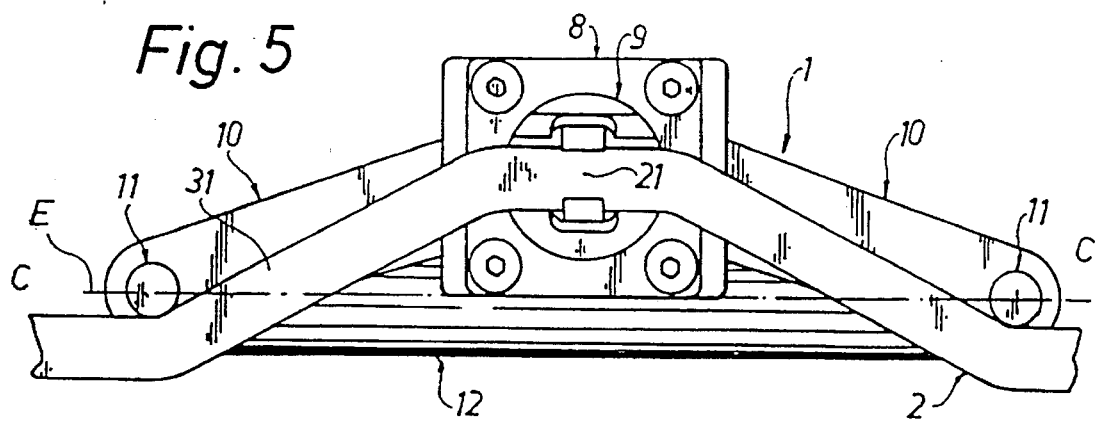
FIGS. 5–7 illustrates succesive sequences of the tightening operation.

The function of the indicator 1 described in the aforegoing and illustrated in FIGS. 4–7 is as follows:

With the links 10 assuming their first, lower and stable end position C, see FIGS. 4 and 5, the belt 31 may be placed around and in abutment against the two abutment means 11 on the links and against one of the support faces 25 in the slit 24 of the hub 9.

Figure 6:
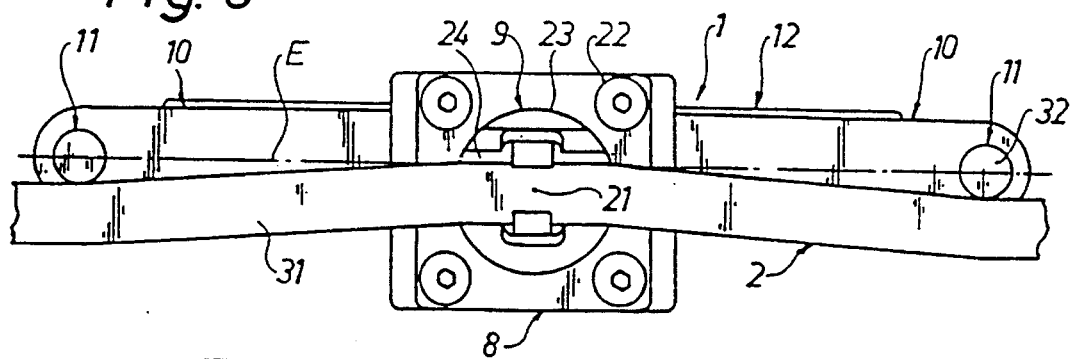

The belt 31 is then tightened, for instance by the generator pulley 6 being forced outwards, i.e. to the left as seen in FIG. 4, while the links 10 are pivoted in synchrony against the action of the helical tension spring 35 until the belt 31 extends along an essentially straight line between the abutment means, see FIG. 6.

Figure 7:
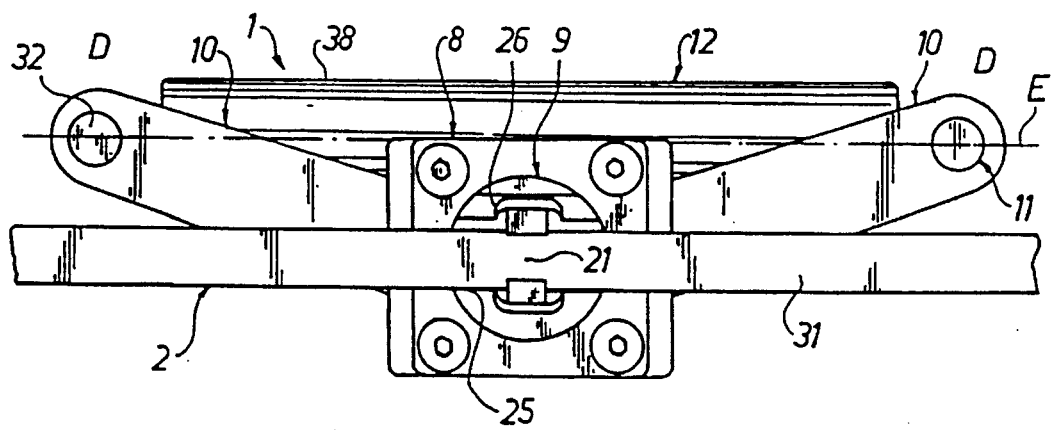

At this moment, the predetermined tension of the belt 31 agrees with the dimensioned and calibrated counter-force of the helical tension spring 35, and under the influence of said helical tension spring, it effects snap-over of the links 10 to their second upper and stable end position D, see FIG. 7.

This snap-over movement is the audible and visible indication of obtainment of the predetermined tension of the belt 31.

In case a belt having a thickness which by a definite value exceeds the thickness of the belt illustrated in the drawings, is to be tightened to the same tension as belt 31, allowing the helical tension spring 35 to remain unchanged, the hub 9 is turned over half a revolution, in such a manner that the support face 26 in the slit 23 in the hub, which face is adapted to the thicker belt, will face downwards to support the belt between the abutment means 11.

The invention should not be regarded as limited to the embodiment illustrated in the drawings and described in the aforegoing but could be modified in a variety of ways within the claimed scope of protection as defined in the appended claims.

I claim:

1. A device for indicating a predetermined tension of an elongate flexible element, comprising:

a base, a hub associated with the base and protruding therefrom and including a means for supporting the elongate element, two links pivotally connected to the base at their first, inner end and projecting in opposing directions from said base essentially at right angles to the hub, each link formed at its opposite, outer end with an abutment, said abutments being equidistantly spaced from the hub to support the elongate element, and resiliently yielding means, connected to said links and possessing a resiliency corresponding to the predetermined tension of said elongate member, for causing said links to move in a synchronized pivotal snap-over movement between a first stable end position and a second stable end position while passing an imaginary line intersecting the abutment means past the hub when the elongate element is arranged on the link abutments and the supporting means while the links are in the first stable end position and is tightened until the elongate element extends along an essentially straight line between the abutments;

wherein the base comprises both a support plate formed with a recess which is open outwards and at its ends for reception therein of the inner ends of the links, and a covering plate covering the recess in the support plate outwardly, and in that the support plate, the covering plate, and the links, in an area of their inner ends, are formed with aligned holes for reception therein of pivot pins by means of which the links are pivotally connected to the base.

2. A device as claimed in claim 1, wherein abutments are provided in the recess in the support plate in order to limit the angle of pivotal movement of the links, said abutments thus determining the two stable end positions of the links.

3. A device as claimed in claim 1, wherein adjacent their inner ends and at a point further inwards than the pivot pins, the links are interconnected by means of a synchronizing mechanism ensuring synchronized pivotal movability of the links.

4. A device as claimed in claim 3, wherein said synchronizing mechanism comprises a pin extending through aligned holes formed in the links, one of said holes being essentially circular whereas the other one is essentially oblong, whereby the pin is allowed some lateral movement in compensation for mutual lateral movement of the holes occurring during the pivotal movement of the links about the pivot pins between the two stable end positions.

5. A device as claimed in claim 4, wherein in an area of the synchronizing mechanism the links are formed with facing recesses, whereby the innermost portions of the inner ends of the links overlap and abut one against the other and receive the synchronizing mechanism, and in that the links are formed with inner edge faces in abutment against counter edge faces formed in said links in a merger area between the latter and the recesses so that edge faces and counter edge faces form cooperating cam faces which upon the synchronized pivotal movement of the links against the action of the resiliently yieldable member determine a link snap-over point.

6. A device for indicating a predetermined tension of an elongate flexible element, comprising:

a base, a hub associated with the base and protruding therefrom and including a means for supporting the elongate element, two links pivotally connected to the base at their first, inner end and projecting in opposite directions from said base essentially at right angles to the hub, each link formed at its opposite, outer end with an abutment, said abutments being equidistantly spaced from the hub to support the elongate element, and resiliently yielding means, connected to said links and possessing a resiliency corresponding to the predetermined tension of said elongate member, for causing said links to move in a synchronized pivotal snap-over movement between first and second stable end positions while passing an imaginary line intersecting the abutment means past the hub when the elongate element is arranged on the link abutments and the supporting means while the links are in the first stable end position and is tightened until the elongate element extends along an essentially straight line between the abutments;

wherein the hub is connected to the base by means of an attachment plate, said attachment plate together with a support plate and a covering plate being assembled by means of fastening means in face-to-face relationship to form a housing, and in that the support in the hub is formed by a transverse slit which is open outwards and at its ends in order to receive the elongate element.

7. A device as claimed in claim 6, wherein the hub is arranged to be turned about a centre axis, and in that a slit is formed with two parallel spaced apart support faces positioned at different distances from the centre axis and intended to support elongate elements of two different thicknesses that are to be tightened by a tightening force of equal magnitude, whereby the same device is used with these elements of different thicknesses while maintaining the magnitude of the reactional force of the resiliently yieldable member.

8. A device for indicating a predetermined tension of an elongate flexible element, comprising:

a base, a hub associated with the base and protruding therefrom and including a means for supporting the elongate element, two links pivotally connected to the base at their first, inner end and projecting in opposite directions from said base essentially at right angles to the hub, each link formed at its opposite, outer end with an abutment, said abutments being equidistantly spaced from the hub to support the elongate element, and resiliently yielding means, connected to said links and possessing a resiliency corresponding to the predetermined tension of said elongate member, for causing said links to move in a synchronized pivotal snap-over movement between first and second stable end positions while passing an imaginary line intersecting the abutment means past the hub when the elongate element is arranged on the link abutments and the supporting means while the links are in the first stable end position and is tightened until the elongate element extends along an essentially straight line between the abutments;

wherein the abutments at the outer ends of the links are in the shape of projecting pins around which the elongate element is wrapped, said pins extending through attachment holes formed in the associated link, the pins positioned on the link face opposite that on which the abutments are positioned, forming attachments for securing the resiliently yieldable member.

* * * * *